(12) United States Patent
Bredow et al.

(10) Patent No.: US 7,499,052 B2
(45) Date of Patent: Mar. 3, 2009

(54) Z-JITTERING OF PARTICLES IN IMAGE RENDERING

(75) Inventors: Rob Bredow, Westchester, CA (US);
Brian Hall, Harbor City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 153 days.

(21) Appl. No.: 11/193,248

(22) Filed: Jul. 29, 2005

(65) Prior Publication Data

US 2006/0022975 A1 Feb. 2, 2006

Related U.S. Application Data

(60) Provisional application No. 60/592,697, filed on Jul. 30, 2004.

(51) Int. Cl.
*G06T 15/40* (2006.01)
*G06T 15/50* (2006.01)

(52) U.S. Cl. .................................. 345/421; 345/426

(58) Field of Classification Search ................ None
See application file for complete search history.

(56) References Cited

U.S. PATENT DOCUMENTS

| | | | | |
|---|---|---|---|---|
| 5,758,046 A * | 5/1998 | Rouet et al. | ................ | 345/419 |
| 5,936,639 A * | 8/1999 | Andalman et al. | .......... | 345/474 |
| 6,720,962 B1 * | 4/2004 | Alter | .......................... | 345/420 |
| 6,809,743 B2 * | 10/2004 | Ebersole et al. | ............. | 345/633 |
| 6,989,831 B2 * | 1/2006 | Ebersole et al. | ............. | 345/420 |
| 2003/0234789 A1 * | 12/2003 | Gritz | .......................... | 345/474 |
| 2005/0219249 A1 * | 10/2005 | Xie et al. | ..................... | 345/473 |
| 2006/0155576 A1 * | 7/2006 | Deluz | ........................... | 705/2 |

OTHER PUBLICATIONS

William T. Reeves, "Particle Systems—a Technique for Modeling a Class of Fuzzy Objects," Apr. 1983, ACM Transactions on Graphics (TOG), vol. 2, No. 2, p. 91-108.*
Andrea J.S. Hin, Frits H. Post, "Visualization Of Turbulent Flow With Particles," Oct. 25, 1993, Proceedings of the IEEE Conference on Visualization, p. 46-52.*
Oded Goldreich, Shafi Goldwasser, Silvio Micali, "How to Construct Random Functions," Oct. 1986, Journal of the ACM (JACM), vol. 33, No. 4, p. 792-807.*
Gary Rosenzweig, "Special Edition Using Macromedia Director 8.5," Nov. 13, 2001, Que, Proquest Safari [online], Appendix I.*
Oded Goldreich, Shafi Goldwasser, Silvio Micali, "How to Construct Random Functions," Oct. 1986, Journal of the ACM (JACM), vol. 33 No. 4, p. 792-807.*

* cited by examiner

*Primary Examiner*—Ulka Chauhan
*Assistant Examiner*—Jason M Repko
(74) *Attorney, Agent, or Firm*—Samuel S. Lee; Procopio, Cory, Hargreaves & Savitch LLP

(57) ABSTRACT

A method of rendering an image having a plurality of objects. The method comprises: generating an adjusted z-position by randomly adjusting the original z-position of an object over a series of samples; sorting the plurality of objects in a sample based on the adjusted z-position of each object of the plurality of objects; and rendering the plurality of objects in a sample based on the sorted order for the sample using the adjusted z-position but at the original z-position to generate a resulting image.

20 Claims, 8 Drawing Sheets

Frontal Frame View

Movement of rendered particle without motion blur

Movement of rendered particle with motion blur

Z-JITTERING OF PARTICLES IN IMAGE RENDERING

CROSS-REFERENCE TO RELATED APPLICATIONS

This application claims the benefit of priority of U.S. Provisional Patent Application Ser. No. 60/592,697 entitled "Image Rendering", filed Jul. 30, 2004. Benefit of priority of the filing date of Jul. 30, 2004 is hereby claimed, and the disclosure of the Provisional Patent Application is hereby incorporated by reference.

BACKGROUND

Presenting an image of a scene including multiple objects arranged in a three-dimensional data model typically involves rendering each of the objects visible from the perspective of a viewer or camera. However, determining which objects and which portions of objects are visible can be a complicated problem. One solution has been to use a depth-sorting process known as the "painter's algorithm."

The painter's algorithm uses a back-to-front approach to rendering objects. All the objects in the scene are sorted in depth order, using the z-positions of the objects in the model. The objects are then rendered one by one in depth order (e.g., drawn to the frame buffer as pixels), beginning with the object furthest from the camera. An object that is in front of a farther object and is obscuring the farther object (from the camera's perspective) will be rendered "on top" of or over the farther object, and so hide those parts of the farther object that are behind the nearer object.

SUMMARY

The present invention provides apparatus, methods, and computer program for z-jittering particles in image rendering.

In one aspect, a method of rendering an image having a plurality of objects is disclosed. The method comprises: generating an adjusted z-position by randomly adjusting the original z-position of an object over a series of samples; sorting the plurality of objects in a sample based on the adjusted z-position of each object of the plurality of objects; and rendering the plurality of objects in a sample based on the sorted order for the sample using the adjusted z-position but at the original z-position to generate a resulting image.

In another aspect, an apparatus for rendering an image having a plurality of objects is disclosed. The apparatus comprises: means for generating an adjusted z-position by randomly adjusting the original z-position of an object over a series of samples; means for sorting the plurality of objects in a sample based on the adjusted z-position of each object of the plurality of objects; and means for rendering the plurality of objects in a sample based on the sorted order for the sample using the adjusted z-position but at the original z-position to generate a resulting image.

In another aspect, a method of rendering an image having a plurality of objects is disclosed. The method, comprises: randomly adjusting the opacity of an object over a series of samples; and rendering the plurality of objects in a sample based on the opacity for the sample to generate a resulting image.

In another aspect, a computer program, stored in a tangible storage medium, for rendering an image having a plurality of objects is disclosed. The program comprises executable instructions that cause a computer to: generate an adjusted z-position by randomly adjusting the original z-position of an object over a series of samples; sort the plurality of objects in a sample based on the adjusted z-position of each object of the plurality of objects; and render the plurality of objects in a sample based on the sorted order for the sample using the adjusted z-position but at the original z-position to generate a resulting image.

DETAILED DESCRIPTION

The present invention provides methods and apparatus for image rendering. In one implementation, an image rendering system provides a renderer as a software tool that controls the rendering of objects in an image using one or more depth techniques to evaluate depth information of the objects. In one depth technique referred to as "z-jittering", the renderer adjusts the depth of an object across a set of multiple rendering samples to change the depth order of the object in the sample set. In another depth technique referred to as "z-depth matting", the renderer selectively obscures objects according to the depth information of an object and a depth image created for one or more other objects.

In one implementation, the renderer is a particle renderer used for rendering particle systems. The renderer is part of an imaging pipeline. In this case, the renderer is responsible for rendering the particle effects in an image and the rendered image is composited with other rendered images to produce a final result. In addition, the physical or geometry model is controlled outside the renderer so that the renderer does not need to calculate behavior of the particles.

Figure 1:
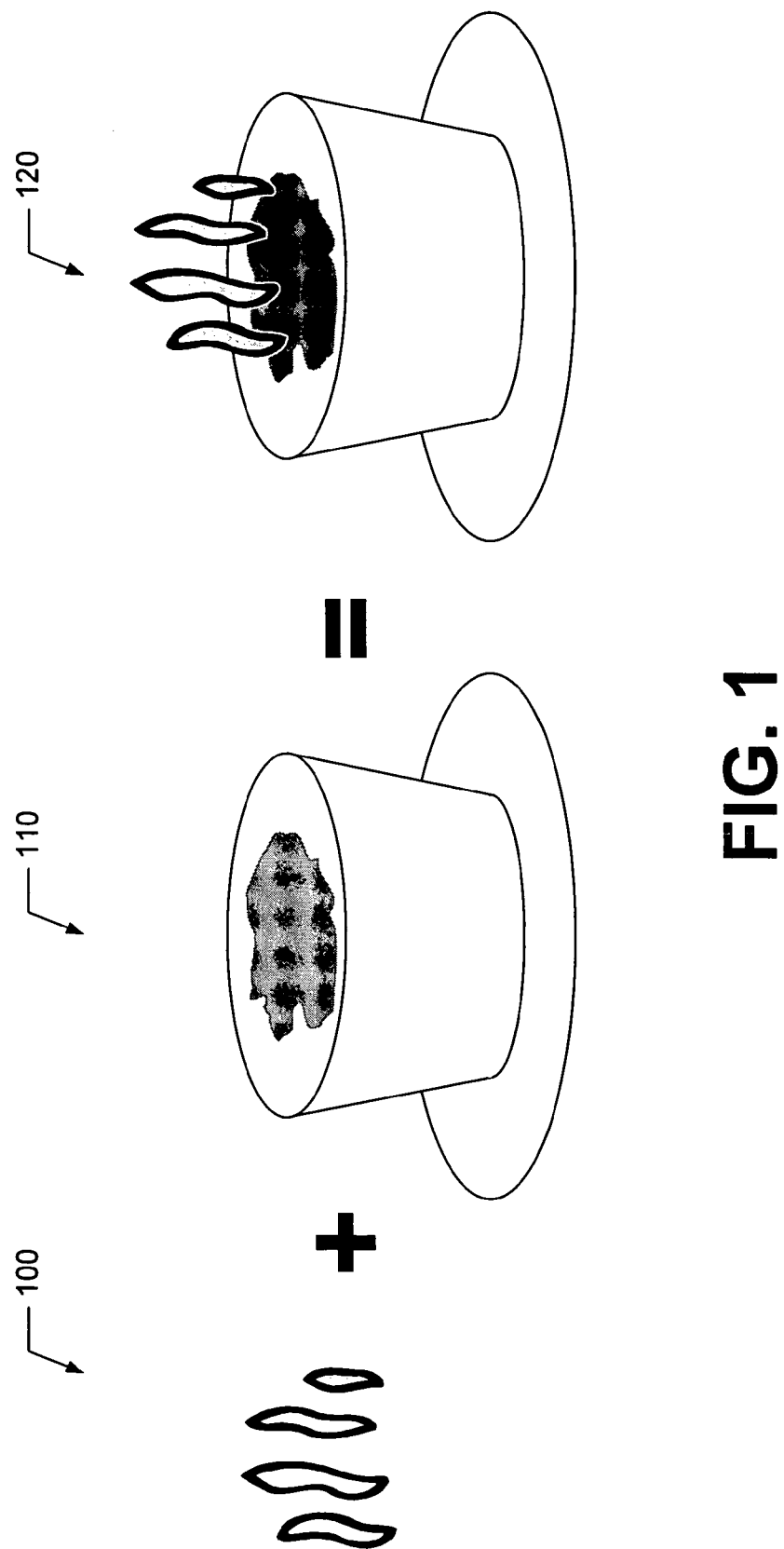
FIG. 1 illustrates a process for rendering an image of a cup of hot coffee.

In one example illustrated in FIG. 1, an image of a cup of hot coffee is rendered. In the illustrated example, the renderer renders an image of steam 100 rising from the coffee based on received particle information (e.g., particle position and characteristics) and another renderer renders an image of the cup and the coffee 110 so that the resulting images from the two renderers are composited to form a final image of a cup of coffee with steam 120.

In other examples, various types of effects or elements can be generated with particle systems, such as smoke, fire, fog, snow, ice, sparks, or other items that are represented by sprites. The description below focuses on implementations where the renderer manipulates and processes particles, however, in other implementations the renderer can process other types of objects.

In one implementation, the renderer is implemented as one or more software components or modules interacting to provide a rendered image of a scene, such as representing one frame of a movie. The renderer has access to one or more hardware graphics systems providing high-speed graphics functionality, such as pixel fill. The renderer uses the graphics systems to perform selected operations in the rendering process. In other implementations, some or all of the renderer is implemented in hardware and/or firmware.

As described above, one depth technique provided by one implementation of a renderer is a z-control or "z-jitter" technique. The z-jitter technique uses modified depth information to control the sort order for rendering particles using a "painter's algorithm" rendering process. As discussed above, using a painter's algorithm, particles to be rendered are sorted in depth order (e.g., based on a z-position in the model for the scene being rendered) and the particles are rendered using that order, back-to-front.

In one implementation, the renderer uses a motion blur technique to represent movement of particles in a series of images. When rendering a series of images or frames to produce animation, the rate of the images may be slower than the rate of time in the model for controlling the particles. For example, the images may be rendered to produce a rate of 30 images (frames) per second so that the time between images is $\frac{1}{30}^{th}$ of a second, or 0.033 seconds. However, the model for controlling motion operates using time increments of 0.011 seconds (in this example). Accordingly, the model could produce up to 3 samples for each frame. Rather than using a single sample for each frame, the renderer uses multiple samples for a frame and accumulates or averages the results. In one implementation, the renderer renders each sample and combines the sample renderings to use for rendering the frame.

Figure 2:
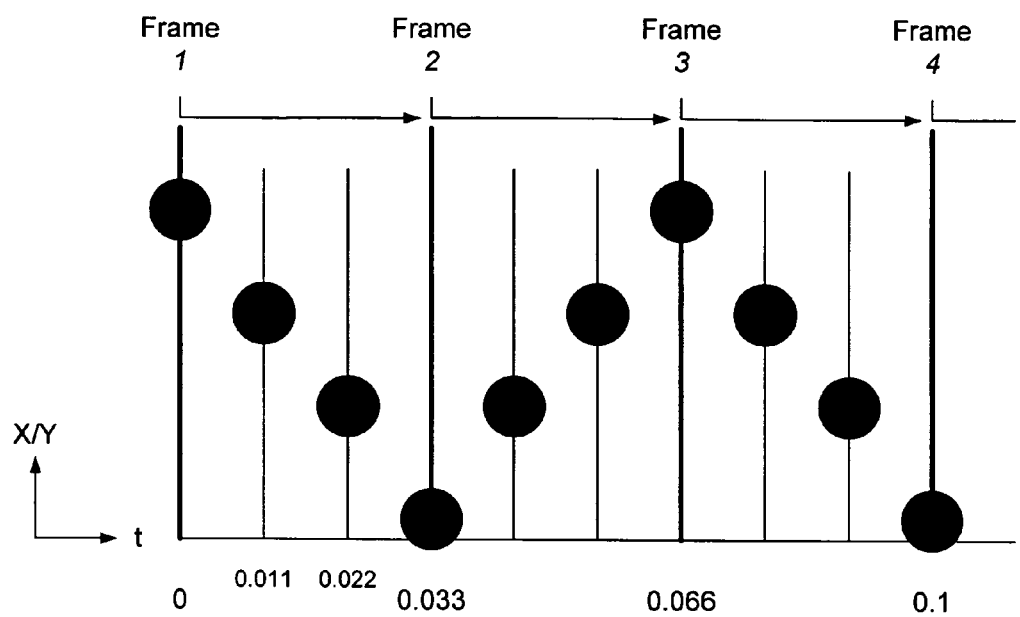
FIG. 2 illustrates particles in a number of samples evenly spaced in time.

For example, as shown in FIG. 2, the renderer receives a number of samples from evenly spaced points in time for the period corresponding to a frame. Using a frame rate of 30 fps (frames per second), the first frame represents the period from 0 to 0.032 seconds, the second frame represents the period from 0.033 to 0.065 seconds, and so on. The model generates 3 samples at intervals of 0.011 seconds for each frame (⅓ of 0.033). For the first frame, the renderer receives samples for times 0, 0.011, and 0.022 seconds. The renderer renders an image for each of the samples and combines the resulting images of the samples (e.g., averaging) to form the final image for the frame. In one implementation, the settings controlling how the samples are created are controlled by a user (e.g., set through a user interface of the renderer), such as the rate for the samples, the number of samples, the period to be divided to generate the samples (e.g., using samples in only the first half of the period of a frame to simulate the open period of a camera shutter).

Figure 3A:
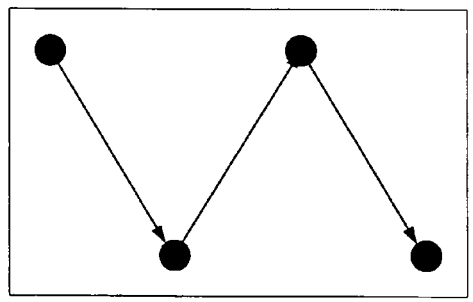
FIG. 3A illustrates movement of rendered particles without motion blur.
Figure 3B:
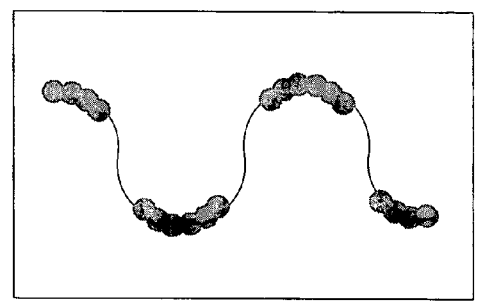
FIG. 3B illustrates movement of rendered particles with motion blur.

The example of FIG. 2 shows the movement of a particle in a series of frames. The y-axis represents the movement of the particle in the x and/or y axes in the spatial domain, whereas the x-axis represents the movement of the particle in the time domain. Thus, when the particle is rendered on a frame-by-frame basis without any motion blur, the movement of the particle may be shown in a choppy motion as shown in FIG. 3A. Alternatively, when the particle is rendered on a frame-by-frame basis with motion blur, the movement of the particle may be shown in a smooth motion as shown in FIG. 3B.

The z-jitter technique uses the same samples provided for the motion blur technique in a depth-sorting process to render a frame. For each sample, the renderer generates an adjusted z-position by randomly adjusting the z-position of a particle. The renderer uses the adjusted z-position for depth-sorting the particle for rendering in depth-order. The renderer does not use the adjusted z-position to move the particle in the model. The renderer then uses that sort order to render the elements of the sample. Therefore, the renderer uses the adjusted z-position for depth sorting but uses the original z-position for rendering the particle.

The pattern for adjusting the z-position is a pseudo-random pattern. In one implementation, the parameters for the pattern can be adjusted by a user (e.g., to control the breadth of the pattern, weighting, spread).

Figure 4:
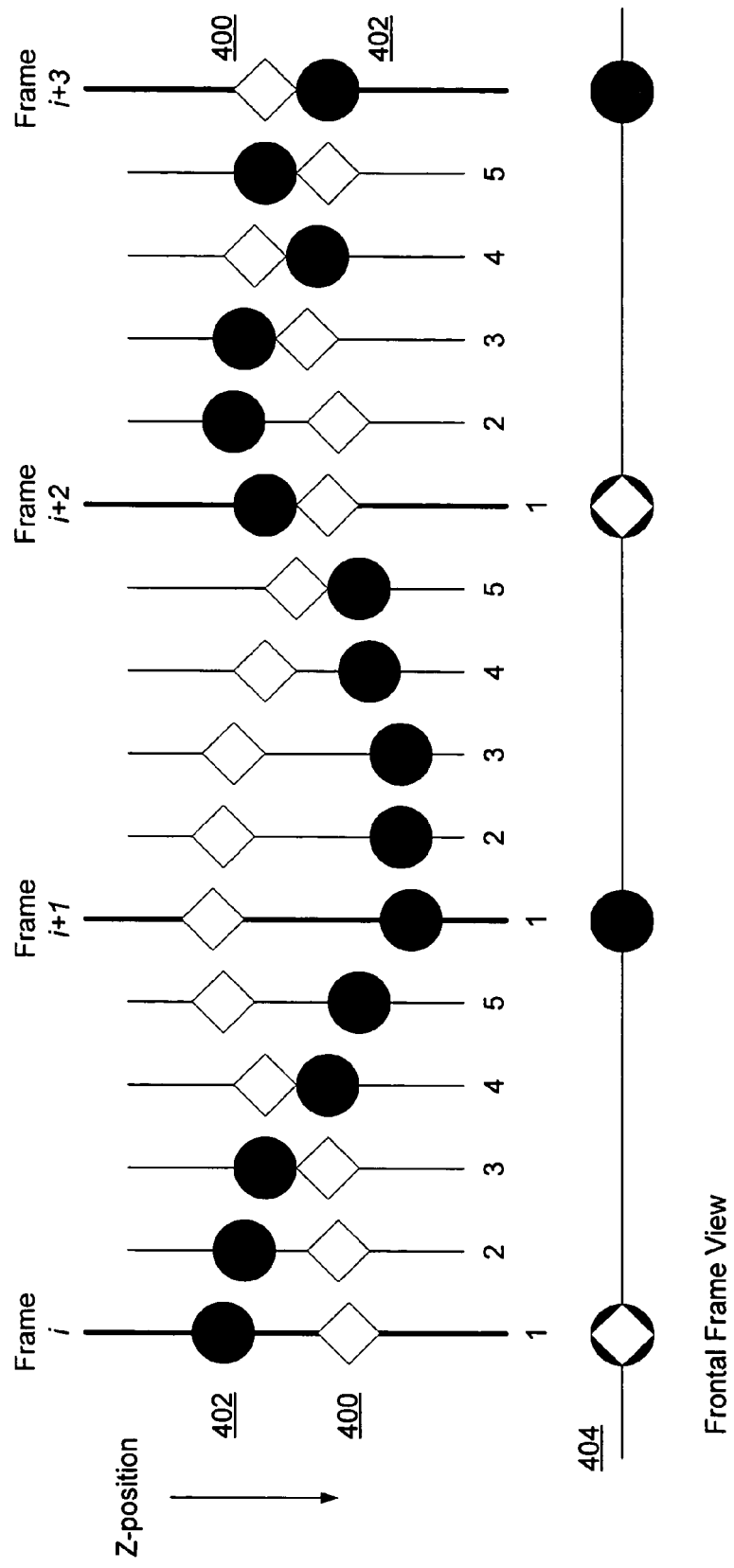
FIG. 4 illustrates z-position movement of two particles, each receiving five samples for one frame.

In one example, shown in FIG. 4, the renderer receives five samples for one frame; and renders two particles 400, 402. In FIG. 4, the y-axis represents the z-position of a particle, wherein the particle is further to the front in the direction of the arrow (i.e., the downward direction). FIG. 4 further shows the frontal view 404 of the particles as they move.

The frontal view 404 illustrates the front view of the particles through a series of frames as seen by a viewer. In this example, in Frame i, the particle 400 is immediately and entirely in front of the particle 402. Thus, for Frame i, the particle 400 is rendered to be in front of the particle 402. Then, from sample 1 to sample 5 of Frame i, the particles 400, 402 move with respect to each other so that the particle 402 is now rendered to be entirely in front of the particle 400 in Frame i+1. As the particles 400, 402 move back and forth, the frontal view 404 shows the movement of the particles only at each frame. Since the frontal view 404 illustrates the front view of the particles 400, 402 for successive frames only, the rendered particles 400, 402 seem to be "popping" in and out of each other. Therefore, without z-jittering, the two particles may stay in the same depth-order through all the samples, and so the near particle would always obscure the far particle. For example, in Frame i+1, the particle 402 is in front of the particle 400 through all samples 1 through 5.

Therefore, without z-jittering (as shown in FIG. 4), the two particles 400, 402 may stay in the same depth-order through all the samples, and so the near particle would always obscure the far particle. For example, in Frame i+1, the particle 402 is entirely in front of the particle 400 through all samples 1 through 5.

Figure 5:
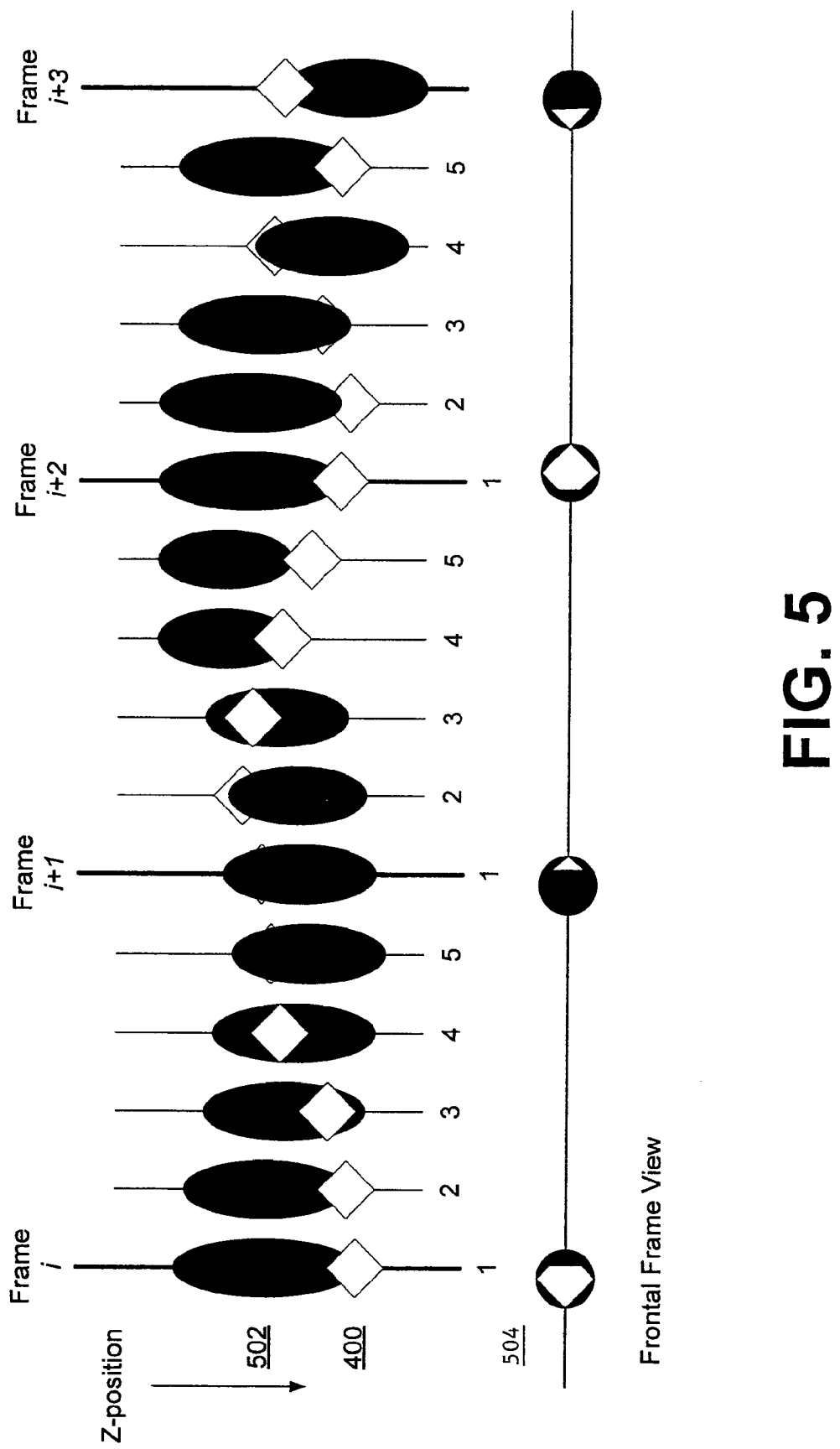
FIG. 5 illustrates z-position movement of two particles, where one particle is z-jittered.

In FIG. 5, one of the particles in the samples is to be z-jittered. The renderer jitters the z-position of the particle 402 (of FIG. 4) in each sample. The z-jittered particle is designated as 502. When the renderer renders each sample, the renderer uses the adjusted z-position for the z-jittered particle 502 to determine where in the depth-sorted order to place the z-jittered particle 502.

With z-jittering, the z-position of the z-jittered particle 502 is randomly adjusted. Therefore, in this example, unlike in FIG. 4, two of the five samples (i.e., samples 4 and 5) in Frame i+1 include the z-jittered particle 502 having a depth that is nearer than the other particle 400. When the renderer renders these two samples, the renderer renders the other particle 400 first and then renders the z-jittered particle 502. When the renderer combines the five samples, the z-jittered particle 502 appears to be smoothly passing through or intersecting with the other particle 400. The frontal frame view 504 shows the front view of the frames such that the two particles move through each other smoothly. Thus, the z-jittering effect can reduce the appearance of the particle 502 "popping" through the other particle 400 when the particles are in motion.

Figure 6:
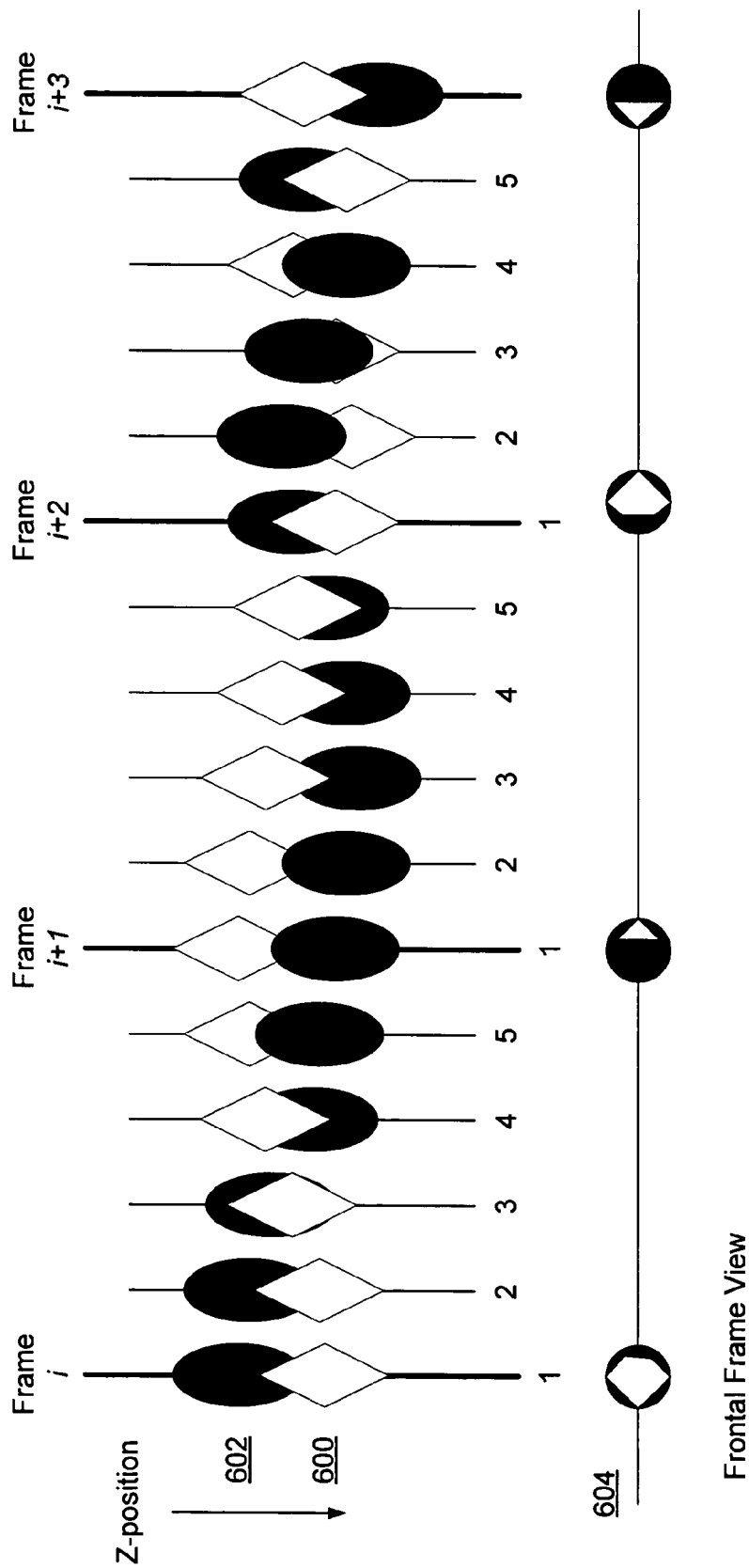
FIG. 6 illustrates z-position movement of two particles, where both particles are z-jittered.

In another implementation, all of the particles in the samples are to be z-jittered. The renderer jitters the z-positions of the particles 400, 402 (of FIG. 4) in each sample. The z-jittered particles are designated as 600, 602 in FIG. 6. When the renderer renders each sample, the renderer uses the adjusted z-positions for the z-jittered particles 600, 602 to determine where in the depth-sorted order to place the z-jittered particles 600, 602. The frontal frame view 604 shows the front view of the frames such that the two particles move through each other smoothly.

Figure 7:
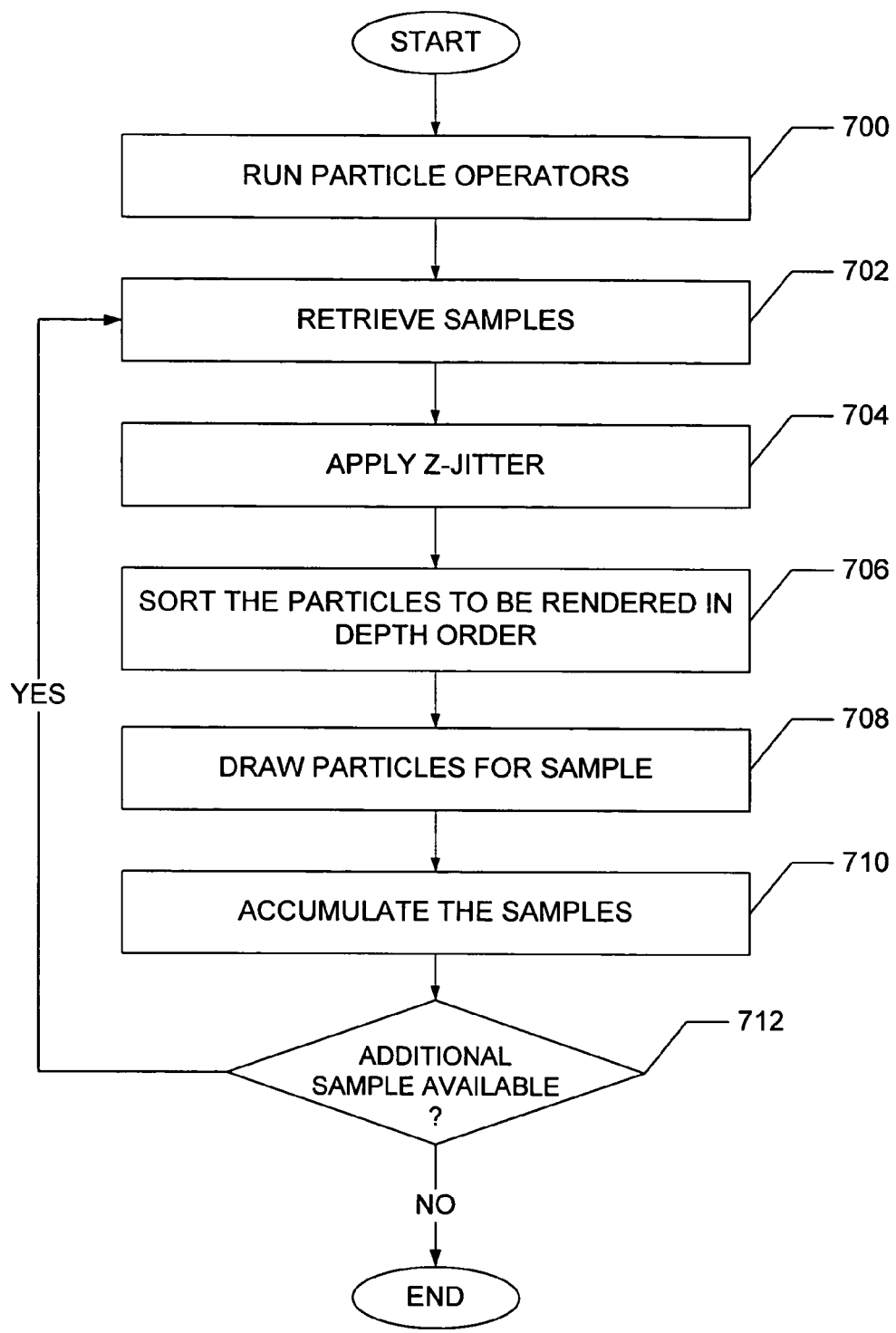
FIG. 7 shows a flowchart of one implementation of rendering an image using a renderer supporting z-jitter and motion blur techniques.

FIG. 7 shows a flowchart of one implementation of rendering an image using a renderer supporting z-jitter and motion blur techniques. The illustrated techniques include running the particle operators, at 700, and retrieving a sample, at 702. The z-jittering technique is applied, at 704, and the particles to be rendered are sorted in depth order, 706. The particles for the sample are drawn, at 708, and the samples are accumulated, at 710. In this example process, drawing a particle includes calculating the instance geometry, running vertex operators, performing lighting calculations, and drawing the particle using the calculated information. Then, at 712, a determination is made whether there is an additional sample. If there is an additional sample, then the sample is retrieved, at 702.

In another implementation, the renderer also jitters the opacity of a particle along with the z-position. The renderer uses the randomly varying opacity to render the particle. This random variation can enhance the blurred or fuzzy quality of nearby particles to further reduce popping. Alternatively, the renderer varies the opacity without adjusting the z-position.

In another implementation, the renderer uses the z-jitter technique without using the motion blur technique. In this case, the samples are used just for z-jitter.

Another depth technique provided by one implementation of a renderer is an image-based three-dimensional matting technique. The renderer hides particles (or portions) that would be obscured in a final image using a depth image. Hiding these obscured particles provides an efficient approach to rendering particle systems over complicated geometries and surfaces.

Figure 8:
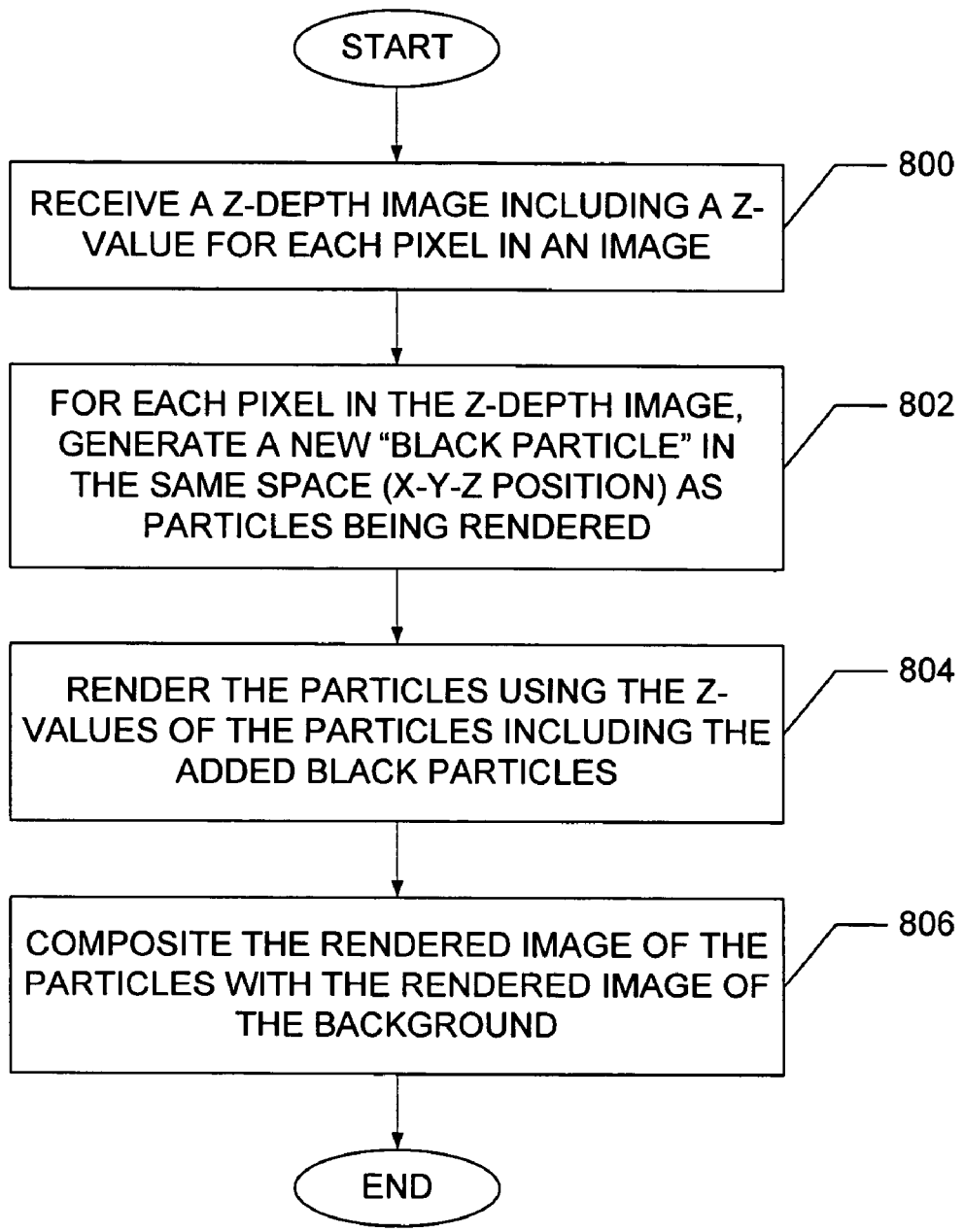
FIG. 8 shows a flowchart of an image-based three-dimensional matting technique.

In one implementation, shown in a flowchart of FIG. 8, the renderer receives a z-depth image from another renderer providing a z-value for each pixel in an image, at 800. The other renderer builds the z-depth image based on the geometry of the objects and surfaces in the scene (the "background"). Alternatively, the renderer builds the z-depth image itself.

For each pixel in the z-depth image, the renderer generates a new "black particle" in the same space as the particles being rendered, at 802. The black particle for a z-depth image pixel is a single pixel particle of an opaque transparency that is positioned at the same x-y position as that pixel and at the z-position indicated by the z-value for that pixel. In one implementation, the "black particle" is black on all channels (RGB and alpha). In another implementation, the "black particle" is any particle that has an opaque transparency on all channels. When the renderer renders the particle system, at 804, now including the added black particles, using, for example, a painter's algorithm (back-to-front), the black particles will obscure pixels of other particles that are "behind" the black particles and the obscured pixels will not be visible. When the rendered image of the particle system is composited with the rendered image of the background (the geometry or surfaces of other objects used to create the z-depth image), at 806, the black particles will not be visible. Consequently, in the resulting image, the particles or parts of particles that would be obscured by the background are hidden and will not be visible.

Figure 9:
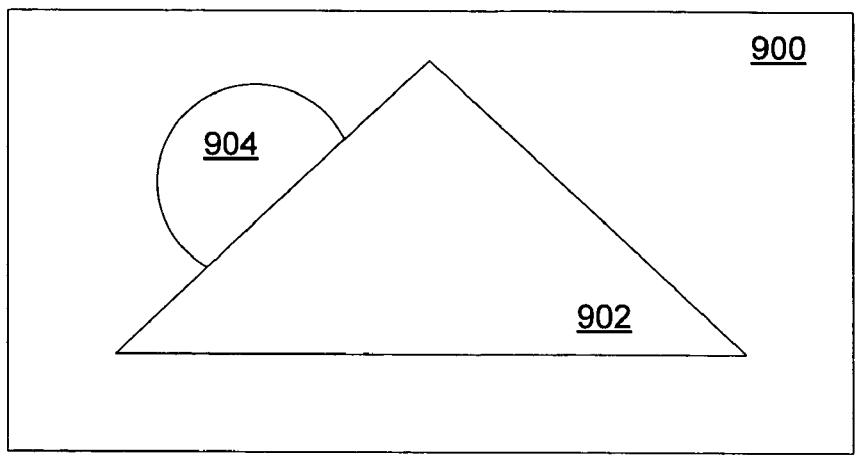
FIG. 9 illustrates an image showing a background image and a particle.
Figure 10:
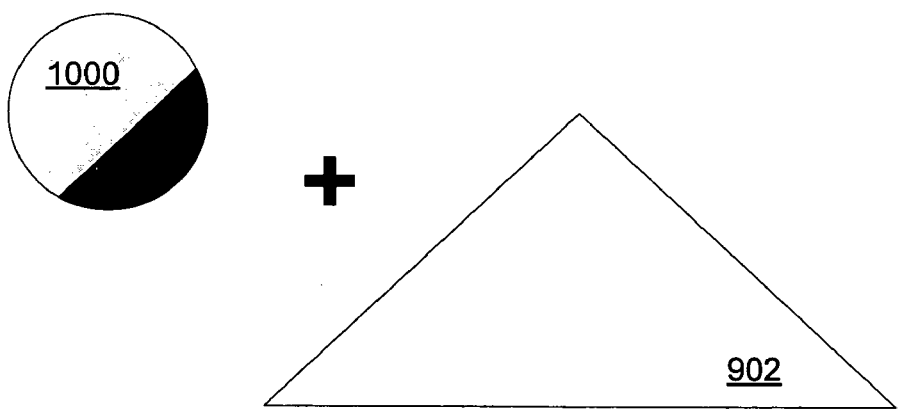
FIG. 10 shows a rendered particle with a hidden portion darkened.

FIG. 9 illustrates the image 900 showing the background image 902 and the particle 904. Since the particle image 904 is partially hidden by the background image 902, the renderer generates black pixel particles in the same space as the particle being rendered 904 for the portion that is hidden FIG. 10 shows the rendered particle 1000 with the hidden portion darkened. The rendered particle 1000 is then composited with the background image 902 to produce the resulting image. The darkened part of the particle 1000 will be obscured by the background image 902 and thus will not be visible.

In another implementation, the renderer compares the z-position of each pixel of a particle with the z-value for the z-depth image pixel corresponding to the particle pixel's position. If a particle pixel has a z-position that is greater than the z-value for the corresponding z-depth image pixel, the particle pixel is "behind" the surface indicated by the z-depth image and so the renderer changes that particle pixel to black (RGB and alpha). These darkened pixels will be hidden.

In one implementation, the renderer uses the painter's algorithm processing, the motion blur technique, the z-jitter technique, and the image-based 3-D matting technique. In other implementations, different combinations of these techniques are used, or are selectively used according to user input.

In another implementation, the renderer also uses a deep texture or deep shadow technique in combination with some or all of the other techniques. A deep texture technique treats an image pixel as having multiple layers of varying opacity. The renderer can use the multiple layers of the image pixels for ordering in the painter's algorithm (e.g., sorting layers), adjustment in the z-jitter technique (e.g., moving the layers independently), or for comparison in the matting technique (e.g., obscuring layers separately), or can use the deep texture technique independently (e.g., before or after applying z-jitter and/or matting).

In a particular implementation, the above-described techniques of z-jittering and z-depth matting are implemented in a software package referred to as Sony Pictures Layered Art Technology (SPLAT), which interactively lights and shades particle data. Through the use of hardware acceleration, SPLAT can generate full-quality renderings of volumetric effects in a few seconds, rather than the minutes or hours required by most rendering systems. Procedural shading operators that adjust the display attributes of each particle (such as shape, texture, size, color, opacity) give artists flexibility in defining the look of each render. Fast render times allow many iterations per day, resulting in better quality effects elements. SPLAT provides for the addition of many elements such as smoke, steam, spark and atmospheric elements to a film in a cost-effective manner.

SPLAT provides many features, including, but not necessarily limited to: rendering particles as camera-facing cards or discs (instance geometry is user-definable per particle); sorting particles based on z-distance from camera and drawn from back to front (traditional painter's algorithm); applying each shading operation per particle or per vertex for high detail shading; providing full expression language that allows per particle or per vertex control of shading operations; providing OpenGL hardware renderer for interactive feedback; providing software renderer that produces nearly identical results on machines without graphics cards; providing extensive integration with Photorealistic RENDERMAN® product's deep texture format; providing deep shadows generated from SPLAT used in RENDERMAN® renders to cast shadows and affect atmospheric lighting; providing deep shadows used for self-shadowing within SPLAT; providing z-depth image or deep shadow of scene geometry used as matte geometry within SPLAT; and providing powerful methods for eliminating pops when particles change sort order.

SPLAT can be integrated into a film or effects production pipeline in much the same way that a typical rendering system would be used. SPLAT takes a particle simulation as input (generated with industry standard software products such as Houdini or Maya) and generates final quality rendered images. Those elements are digitally composited into the final shot which is output to film.

SPLAT provides a significant advantage in performance. Running on a general-purpose processor, it can be significantly faster than current commercial renderers. Furthermore, SPLAT is well-suited to hardware acceleration and running it on a conventional commercial graphics card can provide a tremendous increase in performance which allows interactive rendering of high quality imagery.

To achieve good quality renders, SPLAT provides techniques for using images as matte geometry and for eliminating pops when particles change sort order. SPLAT also uses a deep texture format for tight integration with a production rendering pipeline.

SPLAT also uses z-depth images and deep shadows to represent matte geometry. These images are automatically generated from a lighting pipeline at the same resolution as the final output. When loaded into SPLAT, each pixel in the matte image becomes a single particle in the SPLAT scene. Deep shadow images may contain several samples at each pixel location, each of which becomes a particle. These "image strokes" are tagged to render as a single pixel with the opacity of the original pixel sample. They are sorted along with the other particle geometry in the scene and rendered as black pixels (hiding anything behind them).

There are several benefits to this method of representing matte geometry. First, loading these images often takes less memory than loading in the full geometry for a scene. Second, these images provide identical surface subdivision, edge anti-aliasing, and displacement shading in the geometry since the matte images are generated in the same render pass as final renders.

To eliminate pops (e.g., the sudden appearance of a particle), SPLAT combines a motion blur method with render-time jittering of particle data (or "z-jitter"). For motion blur, SPLAT renders the full particle scene in times at evenly spaced sub-frame intervals, with each particle offset by its velocity. These sub-frame samples are accumulated in a floating-point buffer to create the final frame. This motion blur technique reduces popping to some extent, but to reduce it even further SPLAT randomly jitters (changes) both the z-depth and opacity values of each particle (with user-definable jitter ranges) for each sample. The new z-depth value affects only the sort order of the particles (for the "painter's algorithm" technique of adding layers back-to-front using z-depth as a sort order), not the screen-space position. So two particles in close proximity that would previously have popped as they switched sort order will now appear to blend through each other smoothly over several frames as their sort order is randomly jittered. In effect, the previously "flat" particles now have depth which is not available with a traditional application of a painter's algorithm.

The z-jitter feature and the z-depth matting can be combined for the very useful effect of softening the transition between the geometry in the scene and the particle cards.

These enhancements make it possible to render complicated volumetric effects without the limitations traditionally associated with the painter's algorithm.

The various implementations of the invention are realized in electronic hardware, computer software, or combinations of these technologies. Some implementations include one or more computer programs executed by a programmable processor or computer. For example, an imaging system providing a renderer supporting depth techniques as described above includes one or more programmable processors. The renderer can be implemented as a computer program stored on and executed by the imaging system. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations using particles, other objects can also be rendered using depth techniques. Accordingly, the present invention is not limited to only those implementations described above.

What is claimed is:

1. A computer-implemented method of rendering an image having a plurality of objects, executing on electronic hardware, comprising:
generating an adjusted z-position by randomly adjusting the original z-position of each object in each sample of a series of samples,
wherein the adjustments corresponding to each sample are independent of the adjustments corresponding to the other samples; and
for each sample:
sorting the objects in the sample according to the adjusted z-position of each object in the sample; and
rendering each object in the sample to generate a resulting image,
wherein the order of said rendering for the sample is based on the sorted order of the objects in the sample, and each object in the sample is rendered at its original z-position.

2. The method of claim 1, further comprising
combining resulting images of said series of samples to form a final image for a frame.

3. The method of claim 2, wherein said combining resulting images includes
averaging said resulting images.

4. The method of claim 1, wherein said randomly adjusting the original z-position of an object includes
adjusting the original z-position of said object in a pseudo-random pattern.

5. The method of claim 4, wherein a plurality of parameters of said pseudo-random pattern is adjusted by a user.

6. The method of claim 5, wherein said plurality of parameters of said pseudo-random pattern includes
a measure of breadth of the pattern.

7. The method of claim 5, wherein said plurality of parameters of said pseudo-random pattern includes
a weighting factor.

8. The method of claim 5, wherein said plurality of parameters of said pseudo-random pattern includes
a measure of spread of the pattern.

9. The method of claim 1, further comprising
randomly adjusting z-positions of other objects of said plurality of objects over a series of samples.

10. The method of claim 1, wherein said rendering said plurality of objects in a sample includes
calculating instance geometry of said plurality of objects.

11. The method of claim 1, wherein said rendering said plurality of objects in a sample includes
running vertex operators for said plurality of objects.

12. The method of claim 1, wherein said rendering said plurality of objects in a sample includes
performing lighting calculations of said plurality of objects.

13. The method of claim 12, further comprising
rendering said plurality of objects based on said lighting calculations.

14. The method of claim 1, further comprising
randomly adjusting the opacity of said object over a series of samples.

15. The method of claim 1, further comprising:
randomly adjusting the opacity of an object in the sample.

16. A computer-readable medium storing a computer program for rendering an image having a plurality of objects, the program comprising executable instructions that cause a computer to:
generate an adjusted z-position by randomly adjusting the original z-position of each object in each sample of a series of samples,
wherein the adjustments corresponding to each sample are independent of the adjustments corresponding to the other samples; and
for each sample:
sort the objects in the sample according to the adjusted z-position of each object in the sample; and
render each object in the sample to generate a resulting image,
wherein the order of said rendering for the sample is based on the sorted order of the objects in the sample, and each object in the sample is rendered at its original z-position.

17. The computer-readable medium of claim 16, further comprising executable instructions that cause a computer to
combine resulting images of said series of samples to form a final image for a frame.

18. The computer-readable medium of claim 17, wherein executable instructions that cause a computer to
combine resulting images includes executable instructions that cause a computer to average said resulting images.

19. An apparatus for rendering an image having a plurality of objects, comprising:
an electronic hardware for executing software;
means for generating an adjusted z-position by randomly adjusting the original z-position of each object in each sample of a series of samples,
wherein the adjustments corresponding to each sample are independent of the adjustments corresponding to the other samples; and
means for sorting and rendering each sample including:
means for sorting the objects in said each sample according to the adjusted z-position of each object in said each sample; and
means for rendering each object in said each sample to generate a resulting image,
wherein the order of said rendering for said each sample is based on the sorted order of the objects in the sample, and each object in the sample is rendered at its original z-position.

20. The apparatus of claim 19, wherein said means for generating an adjusted z-position by randomly adjusting the original z-position of an object includes
means for generating a pseudo-random number to adjust the original z-position of said object in a pseudo-random pattern.

* * * * *